United States Patent
Kerr et al.

(10) Patent No.: US 8,407,623 B2
(45) Date of Patent: Mar. 26, 2013

(54) PLAYBACK CONTROL USING A TOUCH INTERFACE

(75) Inventors: Duncan Kerr, San Francisco, CA (US); Nick King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 667 days.

(21) Appl. No.: 12/491,687

(22) Filed: Jun. 25, 2009

(65) Prior Publication Data
US 2010/0328224 A1    Dec. 30, 2010

(51) Int. Cl.
G06F 15/00    (2006.01)
G06F 13/00    (2006.01)

(52) U.S. Cl. .................. 715/851; 715/840
(58) Field of Classification Search .............. 715/863, 715/810, 723, 856, 851, 832–835, 837–841, 715/853–855, 763–765
See application file for complete search history.

(56) References Cited

U.S. PATENT DOCUMENTS

| | | | |
|---|---|---|---|
| 5,825,352 A | 10/1998 | Bisset et al. | |
| 6,013,008 A | 1/2000 | Fukushima | |
| 6,396,523 B1 | 5/2002 | Segal et al. | |
| 6,452,617 B1 | 9/2002 | Bates et al. | |
| 6,639,584 B1 | 10/2003 | Li | |
| 6,765,557 B1 | 7/2004 | Segal et al. | |
| 6,837,827 B1 | 1/2005 | Lee et al. | |
| 6,866,613 B1 | 3/2005 | Brown et al. | |
| 7,251,454 B2 | 7/2007 | White | |
| 7,662,065 B1 | 2/2010 | Kahn et al. | |
| 2002/0191029 A1 | 12/2002 | Gillespie et al. | |
| 2005/0134578 A1 | 6/2005 | Chambers et al. | |
| 2005/0216867 A1 | 9/2005 | Marvit et al. | |
| 2005/0228691 A1 | 10/2005 | Paparo | |
| 2006/0010400 A1* | 1/2006 | Dehlin et al. ............... 715/856 |
| 2006/0026535 A1 | 2/2006 | Hotelling et al. | |
| 2006/0097991 A1 | 5/2006 | Hotelling et al. | |
| 2006/0238522 A1 | 10/2006 | Westerman et al. | |
| 2007/0021269 A1 | 1/2007 | Shum | |
| 2007/0152984 A1 | 7/2007 | Ording et al. | |
| 2007/0259716 A1 | 11/2007 | Mattice et al. | |
| 2007/0270721 A1 | 11/2007 | Ananny et al. | |
| 2007/0271065 A1 | 11/2007 | Gupta et al. | |
| 2007/0271387 A1 | 11/2007 | Lydon et al. | |
| 2008/0084400 A1 | 4/2008 | Rosenberg | |
| 2008/0088602 A1 | 4/2008 | Hotelling | |
| 2008/0096726 A1 | 4/2008 | Riley et al. | |
| 2008/0158172 A1 | 7/2008 | Hotelling et al. | |

(Continued)

OTHER PUBLICATIONS

Apple, "Nike+iPod User's Guide," © 2006 Apple Computer, Inc., 18 pages, http://manuals.info.apple.com/en/Nike_+_iPod_User_Guide.pdf.

(Continued)

*Primary Examiner* — Cao "kevin" Nguyen
(74) *Attorney, Agent, or Firm* — Morgan, Lewis & Bockius LLP

(57) ABSTRACT

This is directed to controlling media playback based on particular touch gestures detected by a touch-sensing interface. The electronic device can identify particular touch inputs, such as combinations of tapping and holding a touch sensitive surface, or circular motions. In response to detecting a particular touch gesture, the electronic device can perform a playback operation specifically associated with the detected touch gesture. To provide a consistent user interface with the device, some of the particular touch gestures can match other inputs provided using a button, for example a button integrated on a wired headset. In such an embodiment, the same combination of tapping and holding a touch input and pressing and holding a button can control the same electronic device operations.

28 Claims, 12 Drawing Sheets

U.S. PATENT DOCUMENTS

| | | | |
|---|---|---|---|
| 2008/0165140 A1* | 7/2008 | Christie et al. | 345/173 |
| 2008/0165141 A1 | 7/2008 | Christie | |
| 2008/0225013 A1 | 9/2008 | Muylkens et al. | |
| 2008/0288867 A1 | 11/2008 | Jeong et al. | |
| 2009/0002335 A1 | 1/2009 | Chaudhri | |
| 2009/0058822 A1 | 3/2009 | Chaudhri | |
| 2009/0061837 A1 | 3/2009 | Chaudhri et al. | |
| 2009/0088204 A1 | 4/2009 | Culbert et al. | |
| 2009/0100384 A1 | 4/2009 | Louch | |
| 2009/0233771 A1 | 9/2009 | Quatrochi et al. | |
| 2009/0262088 A1 | 10/2009 | Moll-Carrillo et al. | |
| 2010/0031202 A1 | 2/2010 | Morris et al. | |
| 2010/0058251 A1 | 3/2010 | Rottler et al. | |
| 2010/0060586 A1 | 3/2010 | Pisula et al. | |

OTHER PUBLICATIONS

Apple.com, "Tune Your Run," http://www,apple.com/ipod/nike/, 1 page, Aug. 2008.

Apple. iPhone. User's Guide, Jun. 2007, Apple Inc., 137 pages.

appshopper, "GDial Free—Speed Dial with Gesture," appshopper. com, Mar. 25, 2009, http://appshopper.com/utilities/gdial-free-speed-dial-with-gesture, 2 pages.

CNET, "Sony Ericsson W910," posts, the earliest of which is Oct. 17, 2007, 4 pages, http://news.cnet/crave/?keyword=Sony+Ericsson+W910.

Gadget Spire, "Nike+Apple=Nike Iphone," posted on Apr. 11, 2008, http://gadgetspire.com/nike-apple-nike-iphone, 1 page.

Immersion, "Haptics: Improving the Mobile User Experience through Touch," Immersion Corporation White Paper, © 2007 Immersion Corporation, 12 pages, http://www.immersion.com/docs/haptics_mobile-ue_nov07v1.pdf.

Raman, T., "Eyes-Free User Interaction," Google Research, Feb. 9, 2009, http://emacspeak.sf.net/raman, 25 pages.

Runkeeper.com, "RunKeeper Getting Started Tutorial," http://www.runkeeper.com/doc/iphone/GetStartedTutorial.html, Aug. 2008, 9 page.

Runkeeper.com, "RunKeeper, " http://www.runkeeper.com, Aug. 2008, 1 page.

Skidmore, S., "New Phone Coaches, Monitors Heart Rate," Associated Press, http://news.yahoo.com/s/ap/20080306/ap_on_hi_te/adidas_samsung_2&printer—1, Mar. 6, 2008, 2 pages.

Surprise Software, My CalStep, www.suprisesoftware.com/mycalstep, May 9 2007, 2 pages.

Touch Usability, "Mobile," Mar. 12, 2009, http://www.touchusability.com/mobile/, 9 pages.

Walsh. D., "dwProgressBar 2," www.davidwalsh.name/dwprogressbar-2-stepping-events-mootools-progress-bar, Aug. 5, 2008, 4 pages.

Wikipedia, "Nike+iPod," http://en.wikipedia.org/wiki/Nike%2BiPod, 3 pages.

Office Action dated Oct. 3, 2011, received in U.S. Appl. No. 12/205,847, 63 pages, (Pisula).

Final Office Action dated Apr. 25, 2012, received in U.S. Appl. No. 12/205,847, 43 pages (Pisula).

* cited by examiner

PLAYBACK CONTROL USING A TOUCH INTERFACE

BACKGROUND OF THE INVENTION

A user can control the playback of media using a media playback device in different ways. In particular, the manner in which the user controls the media playback can be set by the particular input interfaces available to the device. If several buttons are available (e.g., buttons associated with dome switches), the user can control media playback by selecting buttons associated with different playback operations. Alternatively, if a display having displayed playback options is available, the user can direct an input interface to select the displayed playback options. For example, a user can select a displayed play/pause option, fast-forward option, rewind option, and volume option.

These input approaches, however, can require physical buttons on which to provide the inputs. This in turn can increase the overall size of the device, or require moving components extending from an exterior surface of the device. These input approaches can also require the display of selectable options, which can require additional power or prevent the user from controlling the media playback without looking at the display (e.g., when the device faces away from the user, for example during a workout).

SUMMARY OF THE INVENTION

This is directed to systems, methods and computer-readable media for controlling media playback based on specific combinations of touch inputs. In particular, this is directed to detecting different combinations of taps, and performing playback operations associated with each of the tap combinations.

In some embodiments, a user can control the playback of media on an electronic device by providing inputs to an input interface, such as a physical button. For example, the electronic device can include several buttons, each of which is associated with a different playback operation. The buttons can be incorporated in the electronic device or remotely coupled, for example wirelessly or using a wire (e.g., buttons in a headphone cable). Alternatively, the electronic device can instead or in addition display selectable playback options, which the user can select using an input interface. The selectable playback options can include, for example, play/pause options, fast forward and rewind options, next and last options, and volume control options. Upon receiving a selection of an option, the electronic device can perform the corresponding media playback operation.

An electronic device, however, may not have dedicated playback control buttons or interfaces. In addition, a user may wish to control media playback operations without needing to first look at a display to select a specific displayed option. To allow a user to control media playback using a touch sensing device without requiring the selection of displayed options, the electronic device can include a mode or configuration for which the touch sensing device can sense touch events, but not display any content on a display. For example, an electronic device with a touch screen can have a mode in which no content is displayed on the touch screen (e.g., the touch screen remains dark), but the touch screen is operative to detect touch events of the user.

The electronic device can associate any suitable combination of touch events with different media playback inputs. In some embodiments, the electronic device can associate tap events with different media playback operations. In particular, the electronic device can associate tap events that correspond to or mimic button press events from a remote input interface (e.g., an in-line button) with the corresponding media playback operations. In one implementation, the electronic device can associate single button presses and single touch events with the same playback operation, and combinations of button presses (e.g., short and long presses) and corresponding touch events (e.g., short and long taps) with the same playback operations.

In some embodiments, the user can control volume operations or other playback operations by providing touch events that do not correspond to button press events provided by a remote input interface. For example, the user can provide a circular touch event to control the volume of played back media. The electronic device can also allow other mechanisms for providing playback controls, such as selectable options selectively displayed on a display (e.g., displayed in response to a specific request from the user).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to providing instructions for media playback operations by detecting tap touches using a touch sensing device.

In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the present invention.

Figure 1:
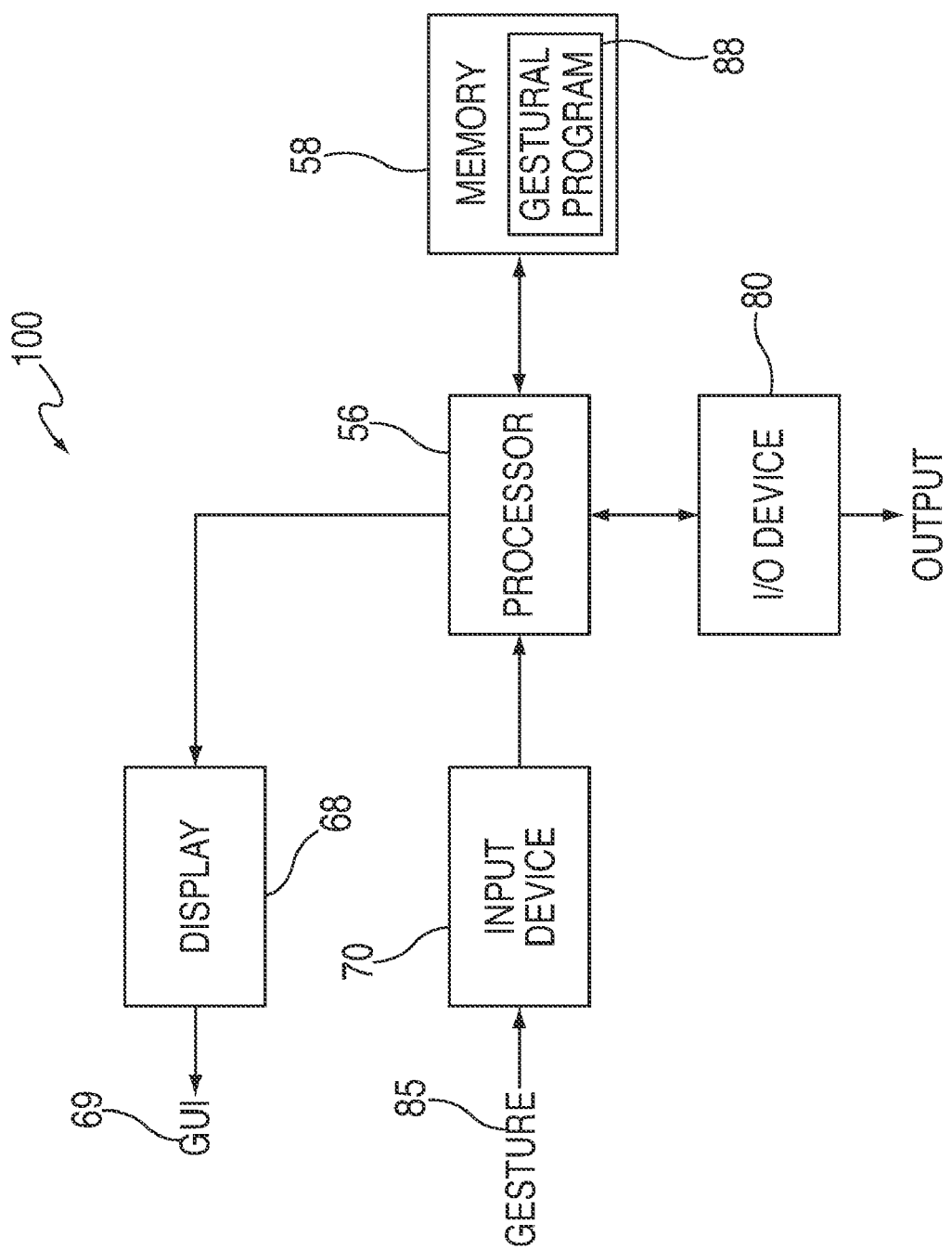
FIG. 1 is a block diagram of a computer system in accordance with one embodiment of this invention.

FIG. 1 is a block diagram of an exemplary computer system 50 in accordance with one embodiment of the present invention. Computer system 50 can correspond to a personal computer system, such as desktops, laptops, tablets or handheld computers. Computer system 50 can also correspond to other computing devices, such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a music recorder, a video recorder, a gaming device, a camera, radios, or any other suitable consumer electronic device.

The exemplary computer system 50 shown in FIG. 1 can include a processor 56 configured to execute instructions and to carry out operations associated with computer system 50. For example, using instructions retrieved for example from memory, processor 56 can control the reception and manipulation of input and output data between components of computing system 50. Processor 56 can be implemented on a single-chip, multiple chips or multiple electrical components. For example, various architectures can be used for processor 56, including dedicated or embedded processor, single purpose processor, controller, ASIC, and so forth.

In most cases, processor 56 together with an operating system can operate to execute computer code and produce and use data. Operating systems are generally well known and will not be described in greater detail. By way of example, the operating system can correspond to OS/2, DOS, Unix, Linux, Palm OS, and the like. The operating system can also be a special purpose operating system, such as can be used for limited purpose appliance-type computing devices. The operating system, other computer code and data can reside within memory block 58 that is operatively coupled to processor 56. Memory block 58 generally provides a place to store computer code and data that are used by computer system 50. By way of example, memory block 58 can include Read-Only Memory (ROM), Random-Access Memory (RAM), hard disk drive and/or the like. The information could also reside on a removable storage medium and loaded or installed onto computer system 50 when needed. Removable storage mediums include, for example, CD-ROM, PC-CARD, memory card, floppy disk, magnetic tape, and a network component.

Computer system 50 can also include display device 68 that is operatively coupled to processor 56. Display device 68 can be a liquid crystal display (LCD) (e.g., active matrix, passive matrix and the like). Alternatively, display device 68 can be a monitor such as a monochrome display, color graphics adapter (CGA) display, enhanced graphics adapter (EGA) display, variable-graphics-array (VGA) display, super VGA display, cathode ray tube (CRT), and the like. Display device 68 can also correspond to a plasma display or a display implemented with electronic inks.

Display device 68 can generally be configured to display graphical user interface (GUI) 69 that can provide an easy to use interface between a user of the computer system and the operating system or application running thereon. Generally speaking, GUI 69 can represent programs, files and operational options with graphical images, objects, or vector representations. The graphical images can include windows, fields, dialog boxes, menus, icons, buttons, cursors, scroll bars, etc. Such images can be arranged in predefined layouts, or can be created dynamically to serve the specific actions being taken by a user. During operation, the user can select and/or activate various graphical images in order to initiate functions and tasks associated therewith. By way of example, a user can select a button that opens, closes, minimizes, or maximizes a window, or an icon that launches a particular program. GUI 69 can additionally or alternatively display information, such as non interactive text and graphics, for the user on display device 68.

Computer system 50 can also include input device 70 that is operatively coupled to processor 56. Input device 70 can be configured to transfer data from the outside world into computer system 50. Input device 70 can, for example, be used to perform tracking and to make selections with respect to GUI 69 on display 68. Input device 70 can also be used to issue commands in computer system 50. Input device 70 can include a touch-sensing device or interface configured to receive input from a user's touch and to send this information to processor 56. By way of example, the touch-sensing device can correspond to a touchpad or a touch screen. In many cases, the touch-sensing device can recognize touches, as well as the position and magnitude of touches on a touch sensitive surface. The touch-sensing device can detect and report the touches to processor 56 and processor 56 can interpret the touches in accordance with its programming. For example, processor 56 can initiate a task in accordance with a particular touch. A dedicated processor can be used to process touches locally and reduce demand for the main processor of the computer system. In some embodiments, input device 70 can be a touch screen that can be positioned over or in front of display 68, integrated with display device 68, or can be a separate component, such as a touch pad.

The touch-sensing device can be based on sensing technologies including but not limited to capacitive sensing, resistive sensing, surface acoustic wave sensing, pressure sensing, optical sensing, and/or the like. Furthermore, the touch-sensing means can be based on single point sensing or multipoint sensing. Single point sensing is capable of only distinguishing a single touch, while multipoint sensing is capable of distinguishing multiple touches that occur at the same time. The touch-sensing can include actual contact of the touch-sensing device, near-touch of the touch-sensing device (e.g. detecting hovering), or remote detection of the user by the touch-sensing device.

Computer system 50 can also include capabilities for coupling to one or more I/O devices 80. By way of example, I/O devices 80 can correspond to keyboards, printers, scanners, cameras, microphones, speakers, and/or the like. I/O devices 80 can be integrated with computer system 50 or they can be separate components (e.g., peripheral devices). In some cases, I/O devices 80 can be connected to computer system 50 through wired connections (e.g., cables/ports). In other cases, I/O devices 80 can be connected to computer system 80 through wireless connections. By way of example, the data link can correspond to PS/2, USB, IR, Firewire, RF, Bluetooth or the like.

In accordance with one embodiment of the present invention, computer system 50 can be designed to recognize gestures 85 applied to input device 70 and to control aspects of computer system 50 based on the gestures 85. In some cases, a gesture can be defined as a stylized interaction with an input device that can be mapped to one or more specific computing operations. Gestures 85 can be made through various hand, and more particularly finger motions. Alternatively or additionally, the gestures can be made with a stylus. In all of these cases, input device 70 can receive gestures 85 and processor 56 can execute instructions to carry out operations associated with the gestures 85. In addition, memory block 58 can include gesture operational program 88, which can be part of the operating system or a separate application. Gesture operation program 88 can generally include a set of instructions that can recognize the occurrence of gestures 85 and can inform one or more software agents of the gestures 85 and/or what action(s) to take in response to the gestures 85. Additional details regarding the various gestures that can be used as input commands is discussed further below.

In accordance with the preferred embodiment, upon a user performing one or more gestures, input device 70 can relay gesture information to processor 56. Using instructions from memory 58, and more particularly, gesture operational program 88, processor 56 can interpret the gestures 85 and control different components of computer system 50, such as memory 58, display 68 and I/O devices 80, based on the gestures 85. Gestures 85 can be identified as commands for performing actions in applications stored in memory 58, modifying image objects shown on display 68, modifying data stored in memory 58, and/or for performing actions in I/O devices 80.

Again, although FIG. 1 illustrates input device 70 and display 68 as two separate boxes for illustration purposes, the two boxes can be realized on one device.

Figure 2:
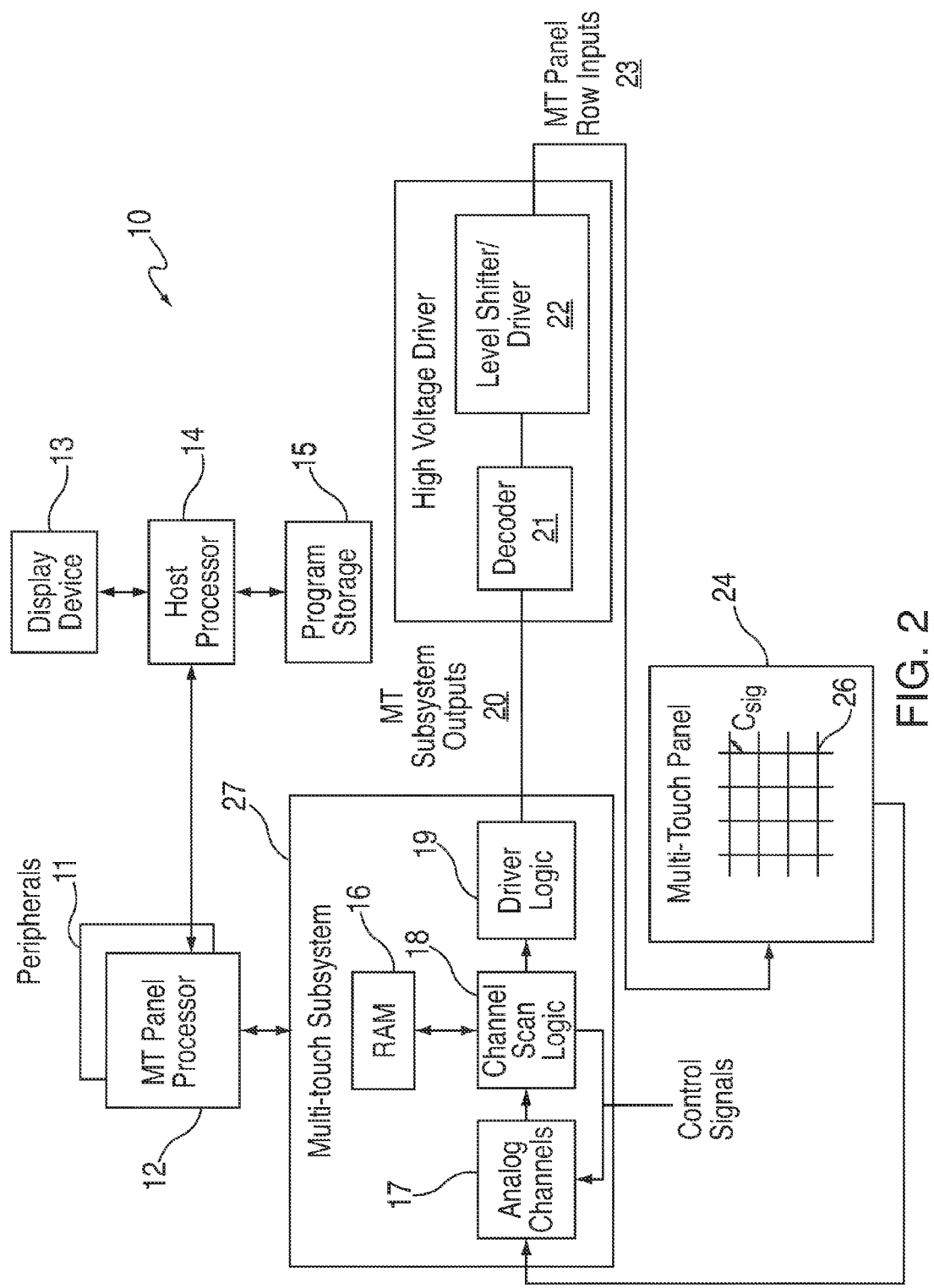
FIG. 2 is a block diagram of another computer system in accordance with one embodiment of this invention.

FIG. 2 illustrates an exemplary computing system 10 that uses multi-touch panel 24 as an input device for gestures, though multi-touch panel 24 can at the same time be a display panel. Computing system 10 can include one or more multi-touch panel processors 12 dedicated to multi-touch subsystem 27. Alternatively, multi-touch panel processor functionality can be implemented by dedicated logic, such as a state machine. Peripherals 11 can include, but are not limited to, random access memory (RAM) or other types of memory or storage, watchdog timers and the like. Multi-touch subsystem 27 can include, but is not limited to, one or more analog channels 17, channel scan logic 18 and driver logic 19. Channel scan logic 18 can access RAM 16, autonomously read data from analog channels 17 and provide control for analog channels 17. This control can include multiplexing columns of multi-touch panel 24 to analog channels 17. In addition, channel scan logic 18 can control driver logic 19 and stimulation signals being selectively applied to rows of multi-touch panel 24. In some embodiments, multi-touch subsystem 27, multi-touch panel processor 12 and peripherals 11 can be integrated into a single application specific integrated circuit (ASIC).

Driver logic 19 can provide multiple multi-touch subsystem outputs 20 and can present a proprietary interface that drives high voltage driver, which can include a decoder 21 and subsequent level shifter and driver stage 22, although level-shifting functions could be performed before decoder functions. Level shifter and driver stage 22 can provide level shifting from a low voltage level (e.g. CMOS levels) to a higher voltage level, providing a better signal-to-noise (S/N) ratio for noise reduction purposes. Decoder 21 can decode the drive interface signals to one out of N outputs, whereas N is the maximum number of rows in the panel. Decoder 21 can be used to reduce the number of drive lines needed between the high voltage driver and multi-touch panel 24. Each multi-touch panel row input 23 can drive one or more rows in multi-touch panel 24. It should be noted that driver 22 and decoder 21 can also be integrated into a single ASIC, be integrated into driver logic 19, or in some instances be unnecessary.

Multi-touch panel 24 can include a capacitive sensing medium having a plurality of row traces or driving lines and a plurality of column traces or sensing lines, although other sensing media can also be used. The row and column traces can be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. In a polar coordinate system, for example, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substrate, or can be formed on two separate substrates separated by a dielectric material. In some instances, an additional dielectric cover layer can be placed over the row or column traces to strengthen the structure and protect the entire assembly from damage.

At the "intersections" of the traces of multi-touch panel 24, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 26, which can be particularly useful when multi-touch panel 24 is viewed as capturing an "image" of touch. In other words, after multi-touch subsystem 27 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel. The capacitance between row and column electrodes can appear as a stray capacitance on all columns when the given row is held at DC and as a mutual capacitance $C_{sig}$ when the given row is stimulated with an AC signal. The presence of a finger or other object near or on the multi-touch panel can be detected by measuring changes to $C_{sig}$. The columns of multi-touch panel 24 can drive one or more analog channels 17 (also referred to herein as event detection and demodulation circuits) in multi-touch subsystem 27. In some implementations, each column can be coupled to one dedicated analog channel 17. However, in other implementations, the columns can be couplable via an analog switch to a fewer number of analog channels 17.

Computing system 10 can also include host processor 14 for receiving outputs from multi-touch panel processor 12 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, etc. Host processor 14, which can be a personal computer CPU, can also perform additional functions that can not be related to multi-touch panel processing, and can be coupled to program storage 15 and display device 13 such as an LCD display for providing a user interface (UI) to a user of the device.

It should be noted that, while FIG. 2 illustrates a dedicated multi-touch panel processor 12, the multi-touch subsystem can be controlled directly by the host processor 14. Additionally, it should also be noted that multi-touch panel 24 and display device 13 can be integrated into one single touch-screen display device. Further details of multi-touch sensor detection, including proximity detection by a touch panel, is described in commonly assigned co-pending applications, including application Ser. No. 10/840,862 titled "Multipoint Touchscreen," which was published on May 11, 2006 as U.S. Publication No. US2006/0097991; application Ser. No. 11/428,522 titled "Identifying Contacts On A Touch Surface," which was published on Oct. 26, 2006 as U.S. Publication No. 2006/0238522, and U.S. application Ser. No. 11/649,998 entitled "Proximity and Multi-Touch Sensor Detection and Demodulation," which was published on Jul. 3, 2008 as U.S. Publication No. 2008/0158172, the entirety of each of which is hereby incorporated herein by reference.

Figure 3:
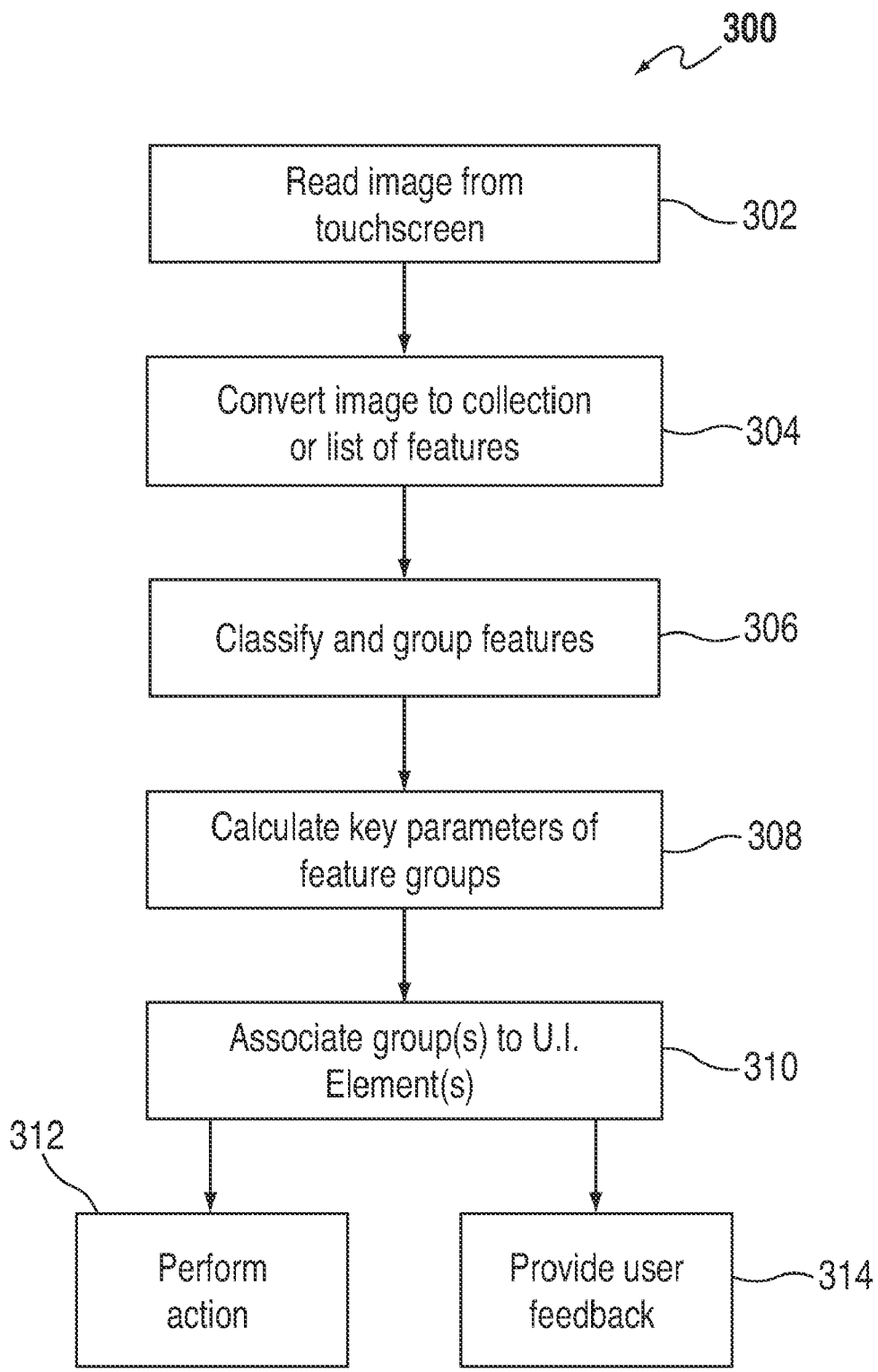
FIG. 3 is a multipoint processing method in accordance with one embodiment of this invention.

FIG. 3 illustrates a multipoint processing method 300 in accordance with one embodiment of the present invention. Multipoint processing method 300 can, for example, be performed with the system shown in FIG. 1 or FIG. 2. Multipoint processing method 300 generally begins at step 302 where images are read from a multipoint input device, and more particularly a multipoint touch screen. Although the term "image" is used it should be noted that the data can come in other forms. In most cases, the image read from the touch screen provides magnitude (Z) as a function of position (x and y) for each sensing point or pixel of the touch screen. The magnitude can, for example, reflect the capacitance measured at each point.

Figure 4A:
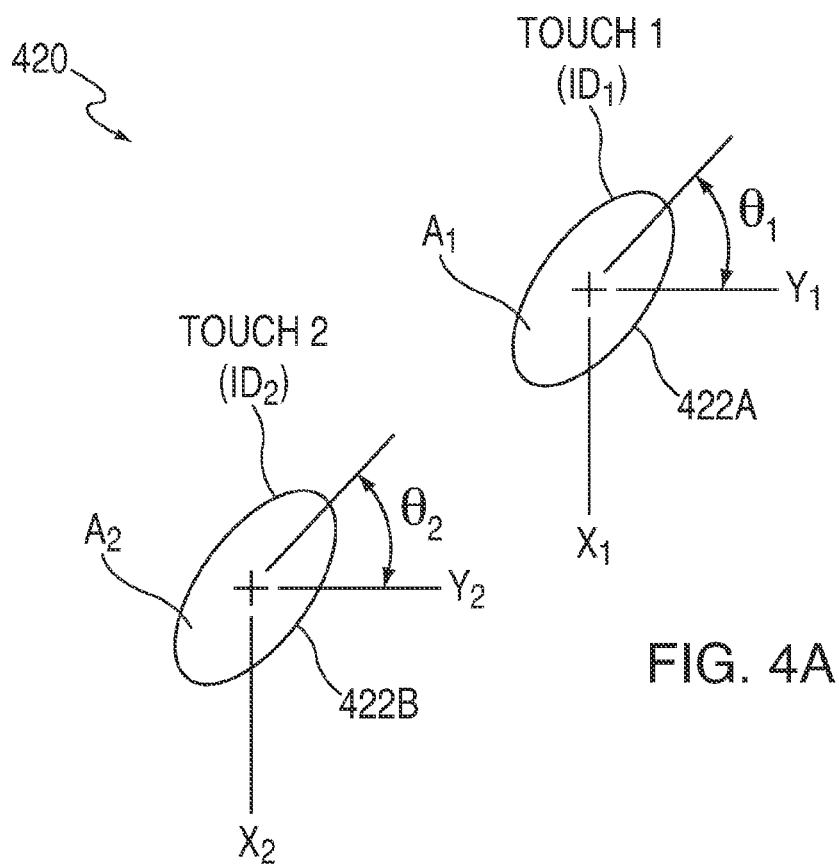
FIGS. 4A and 4B are schematic views of a detected touch image in accordance with one embodiment of this invention.
Figure 4B:
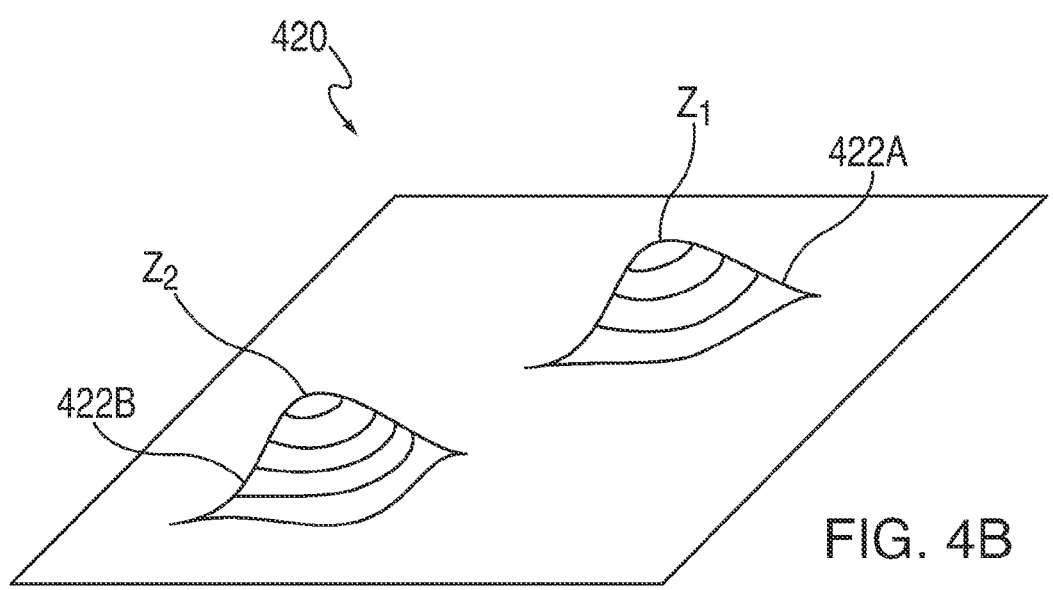

Following step 302, multipoint processing method 300 proceeds to step 304 where the image can be converted into a collection or list of features. Each feature can represent a distinct input such as a touch. In most cases, each feature can include its own unique identifier (ID), x coordinate, y coordinate, Z magnitude, angle θ, area A, and the like. By way of example, FIGS. 4A and 4B illustrate a particular image 420 in time. In image 420, there are two features 422 based on two distinct touches. The touches can for example be formed from a pair of fingers touching the touch screen. As shown, each feature 422 can include unique identifier (ID), x coordinate, y coordinate, Z magnitude, angle θ, and area A. More particularly, the first feature 422A is represented by $ID_1, X_1, Y_1, Z_1, \theta_1, A_1$ and the second feature 422B is represented by $ID_2, X_2, Y_2, Z_2, \theta_2, A_2$ This data can be outputted for example using a multi-touch protocol.

The conversion from data or images to features can be accomplished using methods described in co-pending U.S. application Ser. No. 10/840,862 titled "Multipoint Touchscreen," which is hereby again incorporated herein by reference. As disclosed therein, the raw data can be received in a digitized form, and can include values for each node of the touch screen. The values can be between 0 and 256 where 0 equates to no touch pressure and 256 equates to full touch pressure. Thereafter, the raw data can be filtered to reduce noise. Once filtered, gradient data, which indicates the topology of each group of connected points, can be generated. Thereafter, the boundaries for touch regions can be calculated based on the gradient data (i.e., a determination can be made as to which points are grouped together to form each touch region). By way of example, a watershed algorithm can be used. Once the boundaries are determined, the data for each of the touch regions can be calculated (e.g., X, Y, Z, θ, A).

Returning to FIG. 3, following step 304, multipoint processing method 300 proceeds to step 306 where feature classification and groupings can be performed. During classification, the identity of each of the features can be determined. For example, the features can be classified as a particular finger, thumb, palm or other object. Once classified, the features can be grouped. The manner in which the groups are formed can widely vary. In most cases, the features can be grouped based on some criteria (e.g., they carry a similar attribute). For example, the two features shown in FIG. 4A and FIG. 4B can be grouped together because each of these features is located in proximity to each other or because they are from the same hand. The grouping can include some level of filtering to filter out features that are not part of the touch event. In filtering, one or more features can be rejected because they either meet some predefined criteria or because they do not meet some predefined criteria. By way of example, one of the features can be classified as a thumb located at the edge of a tablet PC. Because the thumb is being used to hold the device rather than being used to perform a task, the feature generated therefrom can be rejected (i.e., is not considered part of the touch event being processed).

Figure 5:
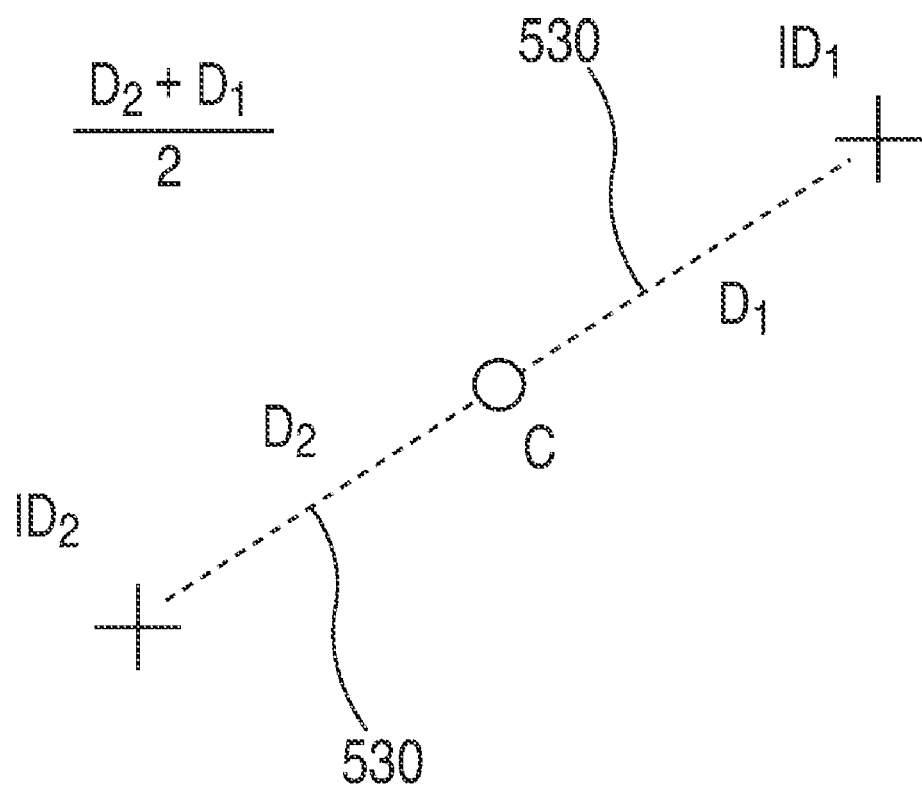
FIG. 5 illustrates a group of features in accordance with one embodiment of this invention.

Following step 306, multipoint processing method 300 proceeds to step 308 where key parameters for the feature groups can be calculated. The key parameters can include distance between features, x/y centroid of all features, feature rotation, total pressure of the group (e.g., pressure at centroid), and the like. As shown in FIG. 5, the calculation can include finding the centroid C, drawing a virtual line 530 to each feature from the centroid C, defining the distance D for each virtual line ($D_1$ and $D_2$), and then averaging the distances $D_1$ and $D_2$ Once the parameters are calculated, the parameter values can be reported. The parameter values can be typically reported with a group identifier (GID) and number of features within each group (in this case three). In most cases, both initial and current parameter values can be reported. The initial parameter values can be based on set down, for example when the user sets their fingers on the touch screen, and the current values can be based on any point within a stroke occurring after set down.

As should be appreciated, steps 302-308 of process 300 can be repetitively performed during a user stroke thereby generating a plurality of sequentially configured signals. The initial and current parameters can be compared in later steps to perform actions in the system.

Following step 308, the process flow moves to step 310 where the group can be associated with a user interface (UI) element. UI elements can be buttons boxes, lists, sliders, wheels, knobs, etc. Each UI element can represent a component or control of the user interface. The application behind the UI element(s) can have access to the parameter data calculated in step 308. In one implementation, the application can rank the relevance of the touch data to the UI element corresponding there to. The ranking can be based on some predetermined criteria. The ranking can include producing a figure of merit and, whichever UI element has the highest figure of merit, giving it sole access to the group. There can even be some degree of hysteresis as well (e.g., once one of the UI elements claims control of that group, the group sticks with the UI element until another UI element has a much higher ranking). By way of example, the ranking can include determining proximity of the centroid (or features) to the image object associated with the UI element.

Following step 310, multipoint process 300 proceeds to steps 312 and 314. Steps 312 and 314 can be performed approximately at the same time. From the user perspective, in one embodiment, steps 312 and 314 appear to be performed concurrently. In step 312, one or more actions can be performed based on differences between initial and current parameter values, and can also be based to a UI element to which they are associated, if any. In step 314, user feedback pertaining to the one or more action being performed can be provided. By way of example, user feedback can include display, audio, tactile feedback and/or the like.

Figure 6:
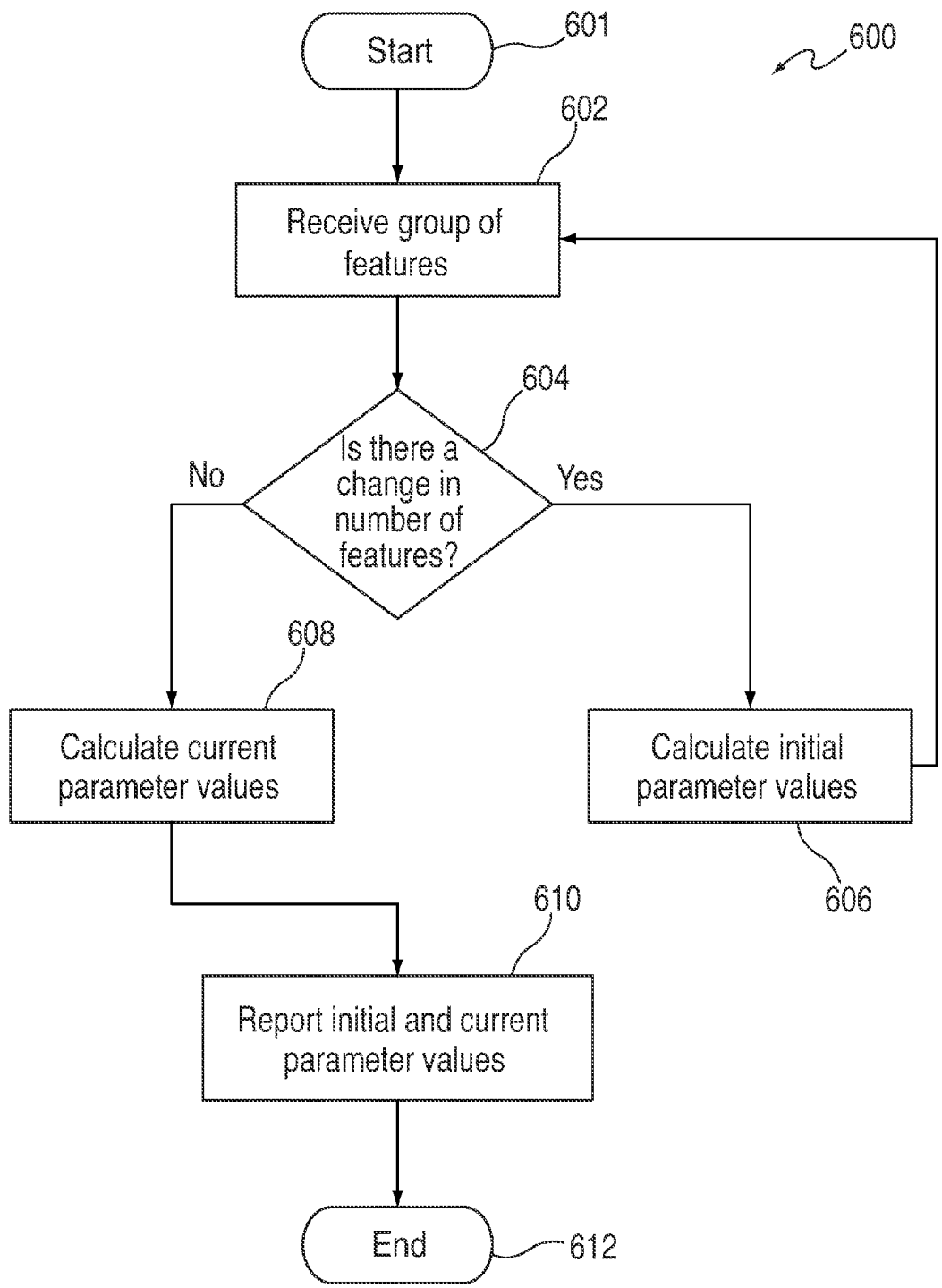
FIG. 6 is a parameter calculation method in accordance with one embodiment of this invention.

FIG. 6 illustrates a parameter calculation method 600 in accordance with one embodiment of the present invention. Parameter calculation method 600 can, for example, correspond to block 308 shown in FIG. 3. The parameter calculation method 600 generally begins at step 601. At step 602, a group of features can be received. Following step 602, the parameter calculation method 600 moves to step 604 where a determination can be made as to whether or not the number of features in the group of features has changed. For example, the number of features can have changed due to the user picking up or placing an additional finger. Different fingers can be needed to perform different controls (e.g., tracking, gesturing). If the number of features has changed, the parameter calculation method 600 proceeds to step 606 where the initial parameter values can be calculated. If the number stays the same, the parameter calculation method 600 proceeds to step 608 where the current parameter values can be calculated. Thereafter, the parameter calculation method 600 proceeds to step 610 where the initial and current parameter values can be reported. By way of example, the initial parameter values can contain the average initial distance between points (or Distance (AVG) initial) and the current parameter values can contain the average current distance between points (or Distance (AVG) current). These can be compared in subsequent steps in order to control various aspects of a computer system.

The above methods and techniques can be used to implement any number of GUI interface objects and actions. For example, gestures can be created to detect and effect a user command to resize a window, scroll a display, rotate an object, zoom in or out of a displayed view, delete or insert text or other objects, etc.

In some embodiments, the electronic device can include several power modes. For example, a in a first power mode, both a touch-sensing device and a display can be powered, such that the user can provide inputs and see content displayed by the device. In a second power mode, the touch-sensing device can be powered, but the display may not be powered such that the electronic device can detect touch events provided by the user without displaying content. For example, in a touch screen embodiment, the electronic device can enable the touch screen to detect touch events without displaying content or selectable options.

Figure 7A:
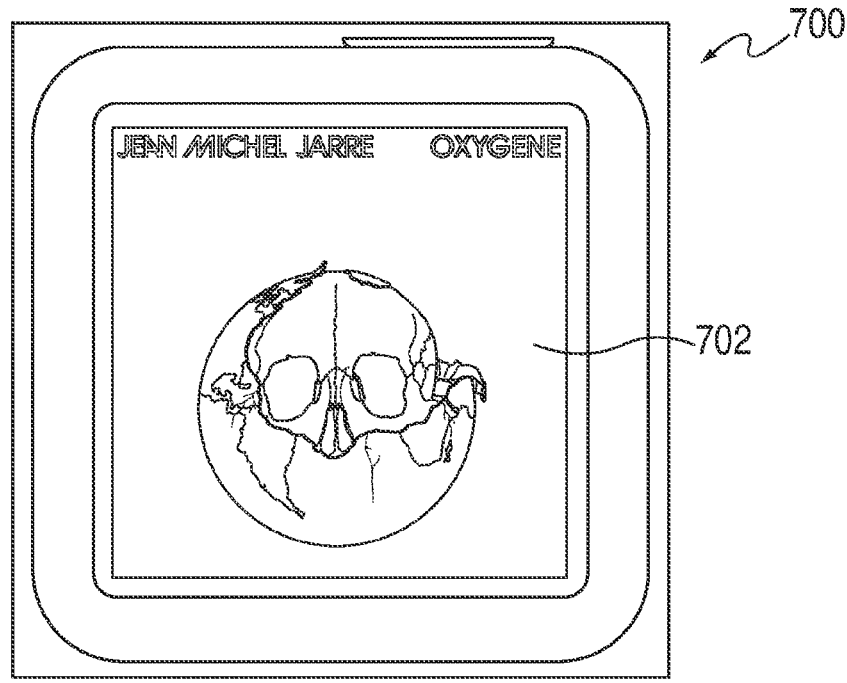
FIG. 7A is a schematic view of a now-playing display in accordance with one embodiment of the invention.
Figure 7B:
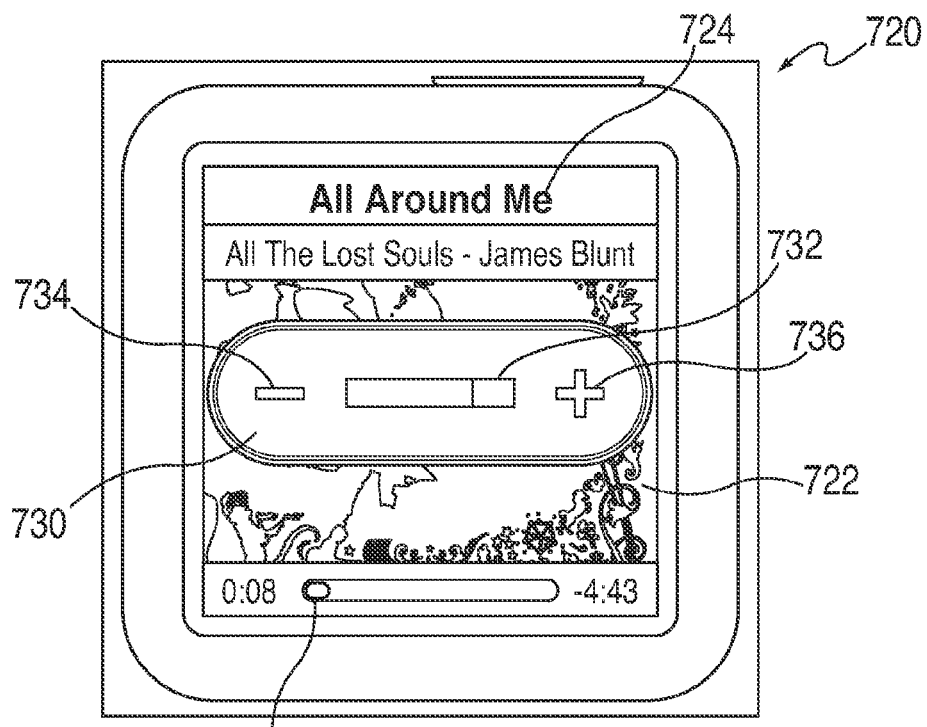
FIG. 7B is a schematic view of a selectable volume overlay on the now-playing display in accordance with one embodiment of the invention.
Figure 7C:
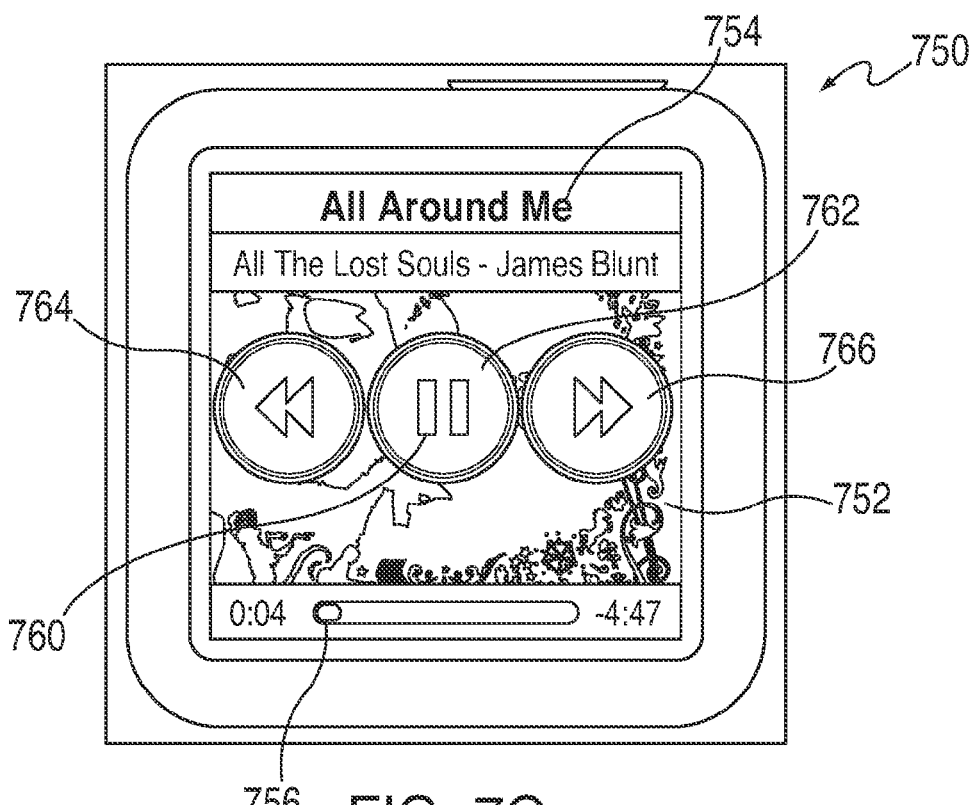
FIG. 7C is a schematic view of a playback control overlay on the now-playing display in accordance with one embodiment of the invention.
Figure 7D:
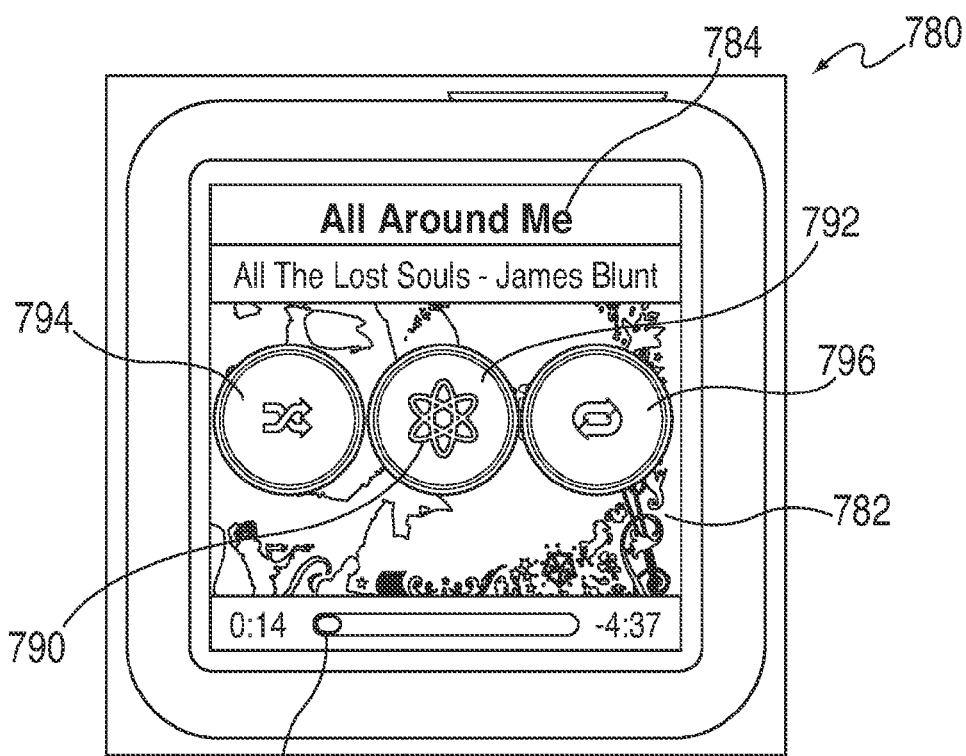
FIG. 7D is a schematic view of a playlist control overlay on the now-playing display in accordance with one embodiment of the invention.

The user can control playback operations using any suitable approach. In some embodiments, the electronic device can display selectable options on a display interface. FIG. 7A is a schematic view of a now-playing display in accordance with one embodiment of the invention. FIG. 7B is a schematic view of a selectable volume overlay on the now-playing display in accordance with one embodiment of the invention. FIG. 7C is a schematic view of a playback control overlay on the now-playing display in accordance with one embodiment of the invention. FIG. 7D is a schematic view of a playlist control overlay on the now-playing display in accordance with one embodiment of the invention. Now-playing display 700 can be provided at any suitable time. For example, display 700 can be provided in response to a user request to view information regarding the media item being played back. Display 700 can include art 702 describing the played back media item. For example, art 702 can include album cover art associated with music items.

To control playback operations, the user can direct the electronic device to overlay selectable options. The electronic device can overlay any suitable number of type of options in response to a user instruction. For example, the electronic device can display, in sequence, volume control, playback control, and playlist control options. Alternatively, the options can be combined or split up in one or more overlays, options for other controls can be displayed, or the order of displayed options can change. Display 720 can include volume overlay 730 displayed over art 720, which can be the same as art 702. The electronic device can also display media identifying information 724 (e.g., song title, artist and album name) and playback indicator 726 (e.g., a progress bar with timing information). Volume overlay 730 can include any suitable option or information. For example, volume overlay 730 can include bar 732 representing the current volume level. The user can change the volume level by selecting decrease option 734 and increase option 736.

Display 750 can include playback control overlay 760 displayed over art 752, which can be the same as art 702. The electronic device can also display media identifying information 754 (e.g., song title, artist and album name) and playback indicator 756 (e.g., a progress bar with timing information). Playback control overlay 760 can include any suitable option or information relating to playback control. For example, playback control overlay 760 can include play/pause option 762. The user can rewind and fast-forward played back media by selecting and holding (e.g., tap and hold or a long tap) next option 764 and back option 766, respectively. The user can also skip to the previous or next media item available for playback (e.g., in a playlist) by selecting without holding (e.g., single tap) options 764 and 766, respectively.

Display 780 can include playlist control overlay 790 displayed over art 782, which can be the same as art 702. The electronic device can also display media identifying information 784 (e.g., song title, artist and album name) and playback indicator 786 (e.g., a progress bar with timing information). Playlist control overlay 790 can include any suitable option or information relating to playlist control. For example, playlist control overlay 790 can include genius playlist option 792 (e.g., for generating a new playlist of media items related to the currently played back media item). The user can toggle playlist shuffling and repeat options by selecting shuffle option 794 and repeat option 796, respectively. In some embodiments, the user can toggle between more than two options in response to selections of displayed options (e.g., toggle between repeat all, repeat one, and repeat none).

While the user can select the options displayed in each of FIGS. 7B-7D, the user may also wish to provide playback instructions and volume control instructions without selecting displayed on-screen options. In one embodiment, the user can provide media playback instructions to the device by providing specific touch gestures each associated with particular operations. In one implementation, the touch gestures can include combinations of taps that match the combinations of button presses associated with a button-based input interface of the device, so that the user can provide inputs using a single input scheme. This approach can be implemented in a reduced power mode, for example when a touch interface is enabled but a display is not.

Figure 8A:
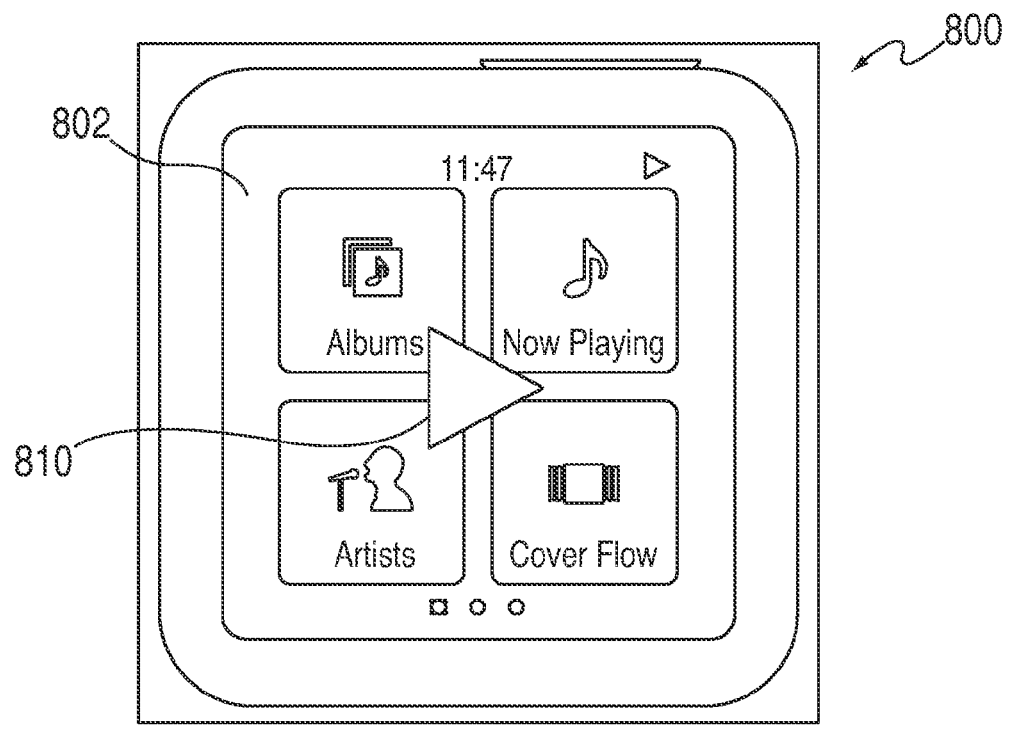
FIG. 8A is a schematic view of an illustrative display having visual feedback for a play touch instruction in accordance with one embodiment of the invention.
Figure 8B:
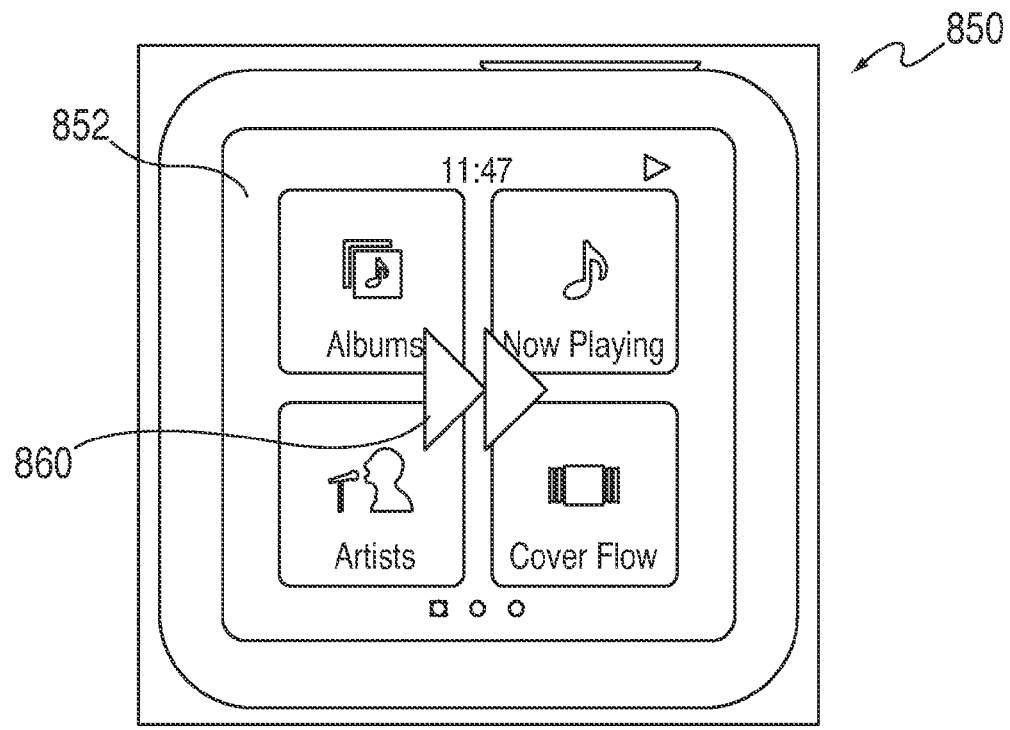
FIG. 8B is a schematic view of an illustrative display having visual feedback for a fast-forward touch instruction in accordance with one embodiment of the invention.

In some embodiments, in response to detecting a particular input associated with a playback instruction, the electronic device can provide a visual confirmation of the instruction on the display. FIG. 8A is a schematic view of an illustrative display having visual feedback for a play touch instruction in accordance with one embodiment of the invention. FIG. 8B is a schematic view of an illustrative display having visual feedback for a fast-forward touch instruction in accordance with one embodiment of the invention. Display 800 can include any suitable background 802, including for example the background displayed at the time the playback touch instruction was received. For example, the background can include several selectable options (e.g., as part of a menu). To indicate to the user that a play instruction was detected, the electronic device can overlay play icon 810 on the display. Play icon 810 can remain displayed for any suitable duration, including for example until the device detects an instruction to hide the icon, until a particular duration lapses (e.g., a 2 second duration), or any other suitable criteria is satisfied. In some embodiments, the electronic device can provide other forms of feedback instead or in addition to displaying icon 810. For example, the electronic device can provide an audio cue (e.g., a series of tones matching the detected touch pattern, or a voice-over describing the identified operation), other forms of visual feedback, vibrations (e.g., a vibration pattern matching the input), or any other suitable feedback.

Display 850 can include any suitable background 852, including for example the background displayed at the time the playback touch instruction was received (e.g., as described in connection with background 802). To indicate to the user that a fast-forward instruction was detected, the electronic device can overlay fast-forward icon 860 on the display. Fast-forward icon 860 can remain displayed for any suitable duration, for example as described above in connection with play icon 810. In some embodiments, the electronic device can provide other forms of feedback instead or in addition to displaying icon 860. For example, the electronic device can provide an audio cue (e.g., a series of tones matching the detected touch pattern, or a voice-over describing the identified operation), other forms of visual feedback, vibrations (e.g., a vibration pattern matching the input), or any other suitable feedback. The electronic device can similarly provide other operation icon overlays for other media playback operations for which touch inputs are detected, including for example pause, rewind, next track and previous track operations.

Figure 9A:
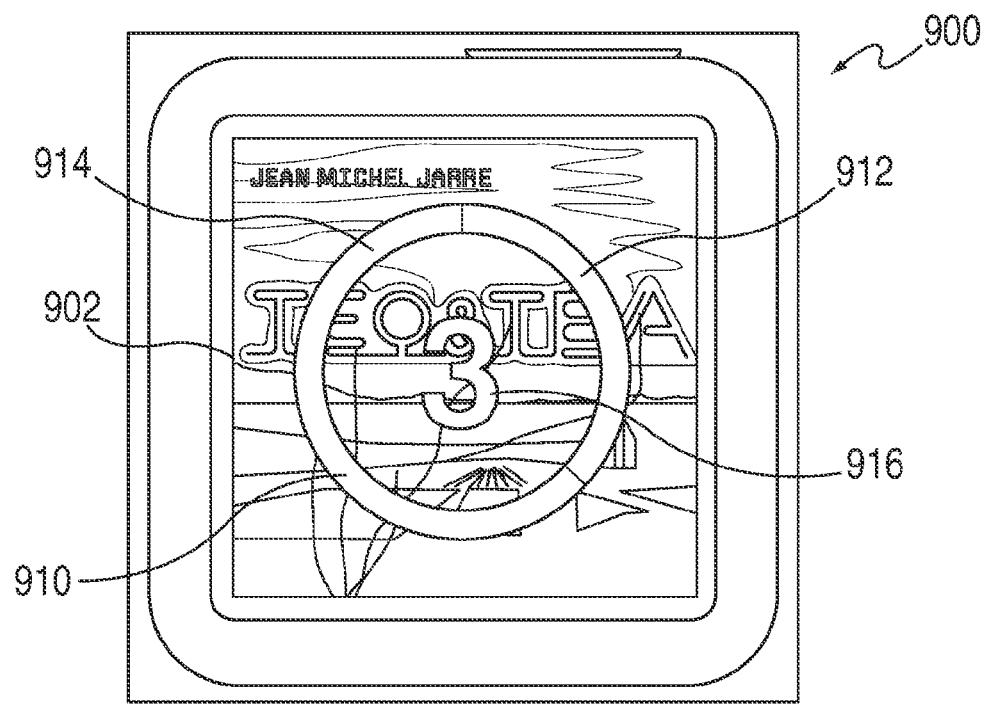
FIG. 9A is a schematic view of a first volume control overlay in accordance with one embodiment of the invention.
Figure 9B:
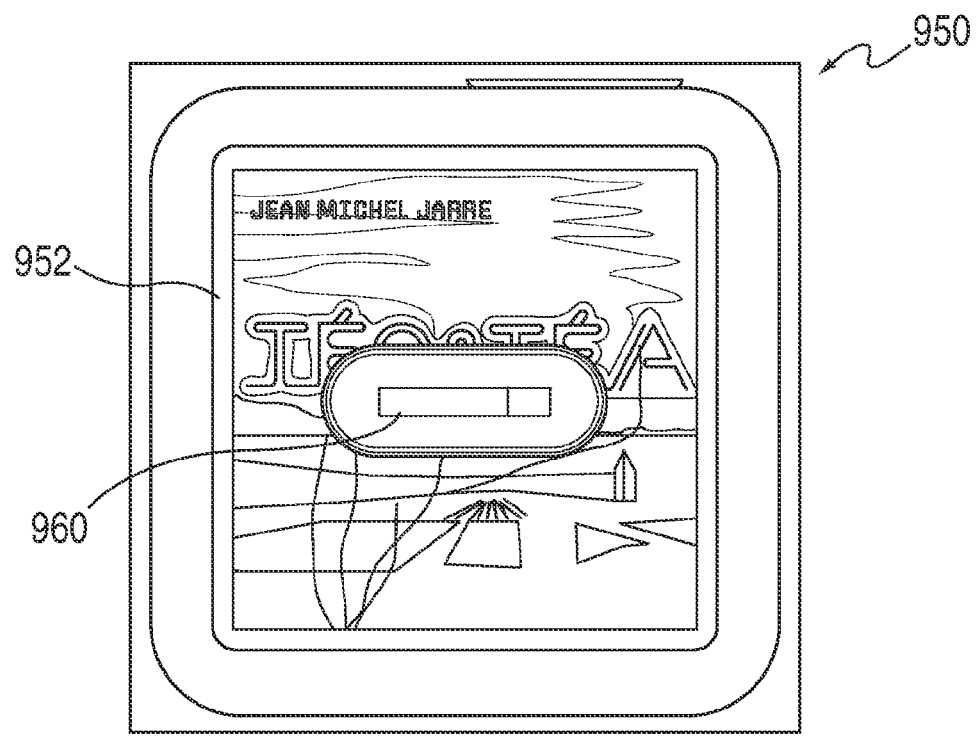
FIG. 9B is a schematic view of a second volume control overlay in accordance with one embodiment of the invention.

In some embodiments, a user can control the volume of played back media by providing particular touch inputs associated with volume control. FIG. 9A is a schematic view of a first volume control overlay in accordance with one embodiment of the invention. FIG. 9B is a schematic view of a second volume control overlay in accordance with one embodiment of the invention. Display 900 can include any suitable background 902, including for example the background displayed at the time the playback touch instruction was received. For example, the background can include album art associated with a "Now Playing" display. To indicate to the user that a volume control instruction was detected, the electronic device can overlay volume animation 910 on the display. Volume animation 910 can include a circular region having distinct continuous portions 912 and 914 graphically depicting the current volume level of the device. For example, portion 912 can be substantially filled and opaque, while portion 914 can be more transparent, where the relative amount of the circular region taken by each of portions 912 and 914 can depict the relative volume level. Volume animation 910 can include number 916 provided within the circular region to numerically quantify the current volume level. As a user provides a volume related touch input (e.g., a circular motion), the size of respective portions 912 and 914, and the displayed number 916 can graphically change to match changes in the volume level. The electronic device can relate volume adjustments and the user's gesture using any suitable approach. For example, volume can be adjusted based on the distance traced around the circle by the user, the angular velocity of the user's gesture, the position of the user's finger relative to an origin, or any other suitable approach. Volume animation 910 can remain displayed for any suitable duration, for example as described above in connection with play icon 810. In some embodiments, the electronic device can provide other forms of feedback instead of or in addition to displaying icon 860, including for example audio feedback, tactile feedback (e.g., vibrations), or other forms of feedback.

Display 950 is an alternate animation depicting volume level. Background 952 can include any suitable background, including for example backgrounds discussed in connection with background 902. Volume bar 960 can be overlaid on background 952 to provide a graphical representation of the current volume level. For example, the size of the opaque portion of volume bar 960 relative to the size of the transparent portion of volume bar 960 can provide a graphical depiction of the volume level. As the device detects a touch input changing the volume level, the electronic device can adjust volume bar 960 to graphically depict the changed volume.

Figure 10:
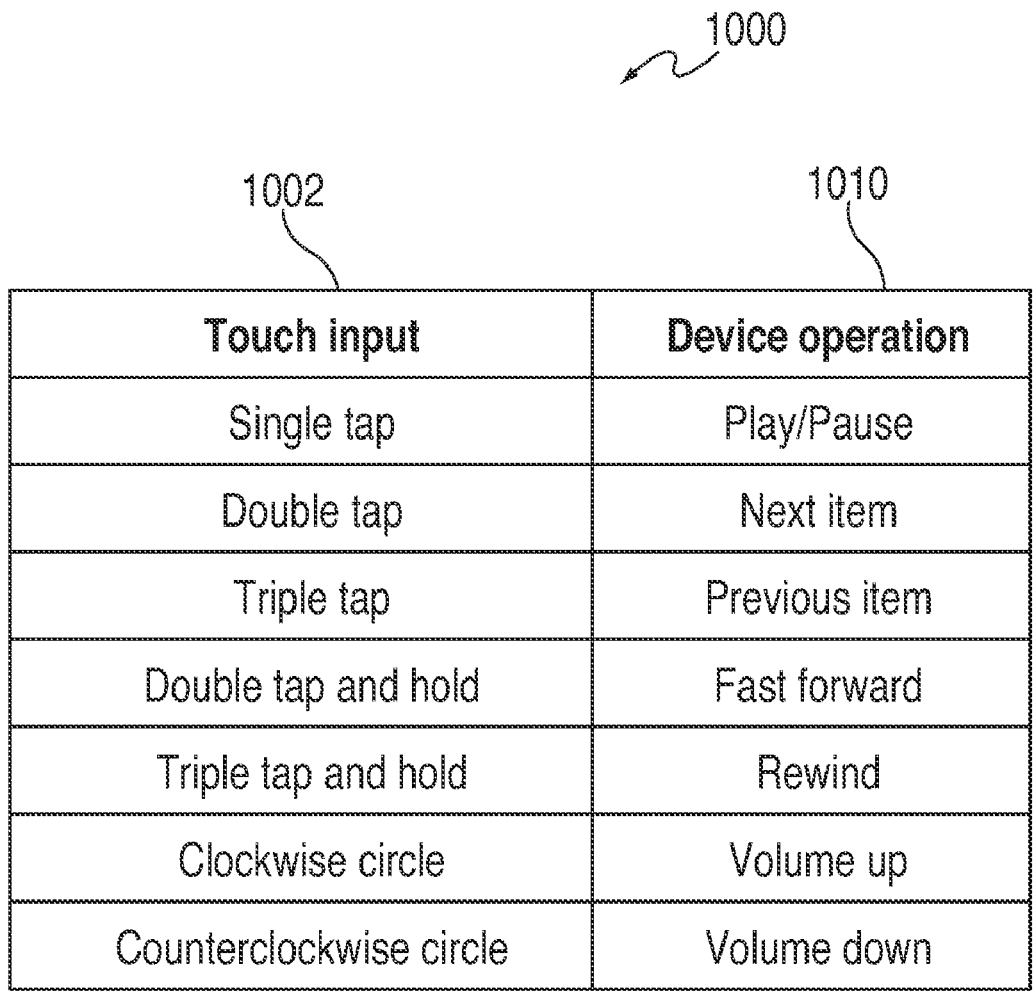
FIG. 10 is an illustrative table of touch input and device operation associations in accordance with one embodiment of the invention.

The electronic device can associate any suitable touch input with corresponding media playback operations. FIG. 10 is an illustrative table of touch event or gesture and device operation associations in accordance with one embodiment of the invention. Table 1000 can include several columns, including for example touch input column 1002 and device operation column 1010. Each row of the table can include a particular touch input and its associated electronic device operation. For example, single tap touch events can be associated with play/pause instructions. Double tap touch events can be associated with next item instructions. Triple tap touch events can be associated with previous item instructions. Double tap and hold (e.g., a short tap followed by a long tap) can be associated with fast forward instructions. Triple tap and hold (e.g., two short tapa followed by a long tap) can be associated with rewind instructions. Clockwise circle touch events can be associated with volume up instructions, and counterclockwise circle touch events can be associated with volume down instructions. The touch event and device operation associations of table 1000 will be understood to be merely illustrative, as any other suitable combination of touch events and device operations can be used instead or in addition to those shown in table 1000 to control device operations. In some embodiments, some of the touch gesture and device operation associations can mimic the associations defined for device operations and inputs provided by a button, such as an in line button on a wired headphone (e.g., touch gesture taps correspond to button clicks).

Figure 11:
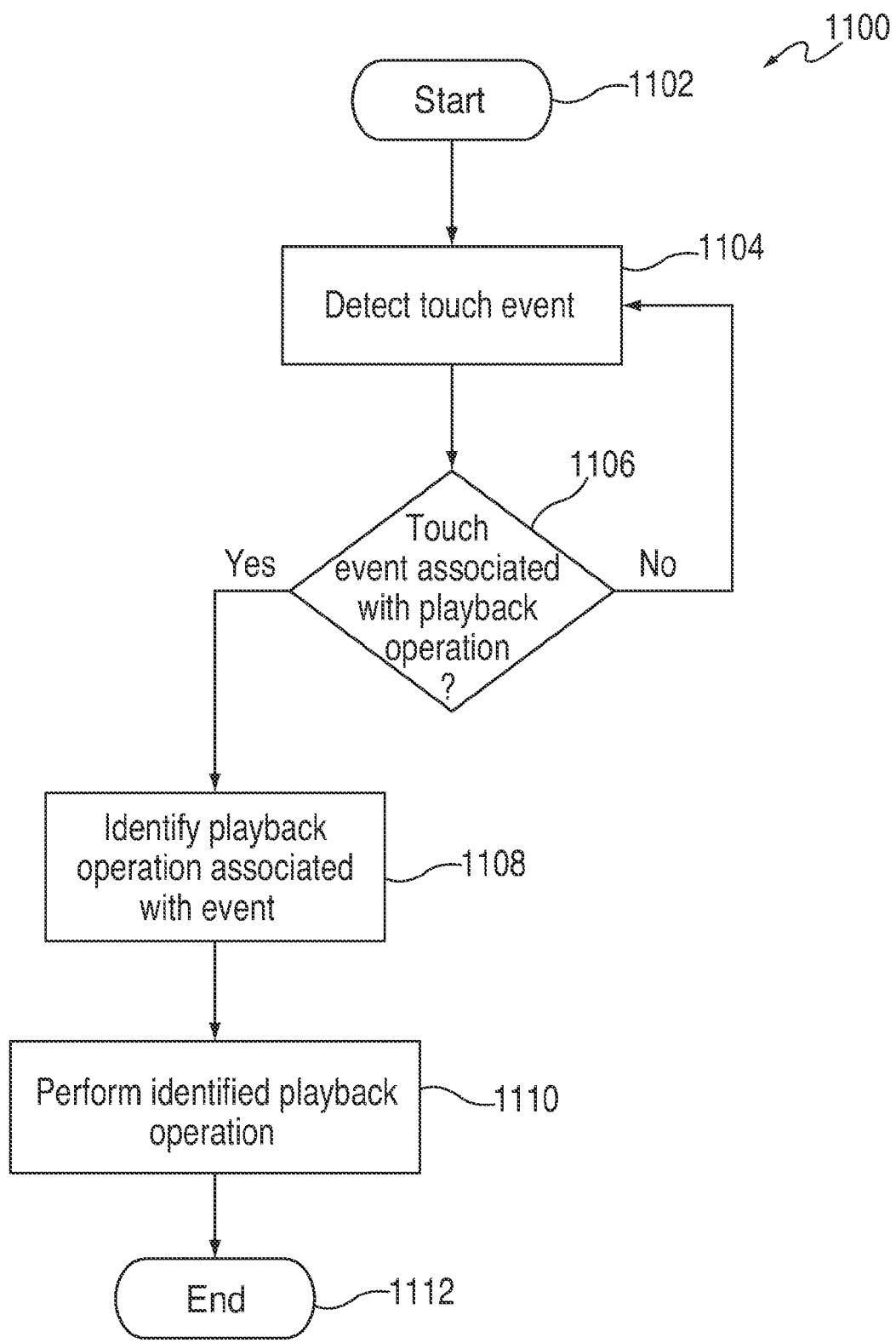
FIG. 11 is a flowchart of an illustrative process for controlling media playback based on detected touch events in accordance with one embodiment of the invention.

The following flowchart describes processes used by the electronic device to control media playback. FIG. 11 is a flowchart of an illustrative process for controlling media playback based on detected touch events in accordance with one embodiment of the invention. Process 1100 can begin at step 1102. At step 1104, the electronic device can detect a touch event. For example, the electronic device can receive an indication from a touch-sensing interface that a touch gesture was detected. The touch-sensing interface can identify the particular touch gesture, and provide identifying information for the gesture to the electronic device control circuitry. For example, the touch-sensing interface can indicate that the detected touch gesture was a particular combination of tapping and holding a finger on a touch sensitive surface, or a circular motion on the touch sensitive surface. At step 1106, the electronic device can determine whether the detected touch event is associated with a playback operation. For example, the electronic device can determine whether the touch event matches one of the events in table 1000 (FIG. 10). If the electronic device determines that the touch event is not associated with a playback operation, process 1100 can return to step 1104 and continue to detect touch events. Alternatively, process 1100 can end.

If, at step 1106, the electronic device instead determines that the detected touch event is associated with a playback operation, process 1100 can move to step 1108. At step 1108, the electronic device can identify the particular playback operation associated with the detected touch event. For example, the electronic device can refer to a table or other data structure associating particular playback operations with different touch gestures. At step 1110, the electronic device can perform the identified playback operation. For example, the electronic device can play, pause, fast forward, or rewind a media item. As another example, the electronic device can skip to a previous or next media item. As still another example, the electronic device can change the volume of the played back media. Process 1000 can then end at step 1112.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDS, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation, and the present invention is limited only by the claims which follow.

What is claimed is:

1. A method for controlling media playback operations using a touch-sensing display interface, comprising:
   detecting a touch gesture on the touch-sensing display interface using the touch-sensing display interface when no content is displayed on the touch-sensing display interface;
   determining that the detected touch gesture is associated with a playback operation; and
   performing the playback operation associated with the detected touch gesture in response to the determining.

2. The method of claim 1, wherein:
   the detecting the touch gesture comprises detecting a single tap touch gesture on the touch-sensing display interface using the touch-sensing display interface; and
   the performing the playback operation comprises at least one of playing and pausing media available for playback.

3. The method of claim 1, wherein:
   the detecting the touch gesture comprises detecting a double tap touch gesture on the touch-sensing display interface using the touch-sensing display interface; and
   the performing the playback operation comprises skipping to a next media track.

4. The method of claim 1, wherein:
   the detecting the touch gesture comprises detecting a triple tap touch gesture on the touch-sensing display interface using the touch-sensing display interface; and
   the performing the playback operation comprises skipping to a previous media track.

5. The method of claim 1, wherein:
   the detecting the touch gesture comprises detecting a double tap and hold touch gesture on the touch-sensing display interface using the touch-sensing display interface; and
   the performing the playback operation comprises fast-forwarding played back media.

6. The method of claim 1, wherein:
   the detecting the touch gesture comprises detecting a triple tap and hold touch gesture on the touch-sensing display interface using the touch-sensing display interface; and
   the performing the playback operation comprises fast-rewinding played back media.

7. The method of claim 1, wherein:
   the detecting the touch gesture comprises:
      detecting a circular motion touch gesture on the touch-sensing display interface using the touch-sensing display interface; and
      determining attributes of the detected circular motion gesture; and
   the performing the playback operation comprises adjusting the volume of played back media based on the determined attributes.

8. The method of claim 7, wherein the determining the attributes further comprises determining at least one of:
   the direction in which the circular motion gesture is traced;
   the speed at which the circular motion gesture is traced;
   the length of the traced circular motion gesture; and
   the position at which the circular motion gesture ends.

9. The method of claim 1, further comprising, in response to the determining, displaying a visual confirmation of the playback operation on the touch-sensing display interface.

10. A portable electronic device comprising a button interface, a touch-sensing display interface, and a processor, the processor operative to:
   direct the touch-sensing display interface to detect a touch gesture on the touch-sensing display interface when no content is displayed on the touch-sensing display interface;
   identify a media playback operation associated with the detected touch gesture; and
   perform the identified playback operation.

11. The portable electronic device of claim 10, wherein the processor is further operative to:
   direct the touch-sensing display interface to display content for the user in response to detecting the touch gesture; and
   direct the touch-sensing display interface to overlay an icon on the displayed content, wherein the icon corresponds to the identified media playback operation.

12. The portable electronic device of claim 11, wherein the processor is further operative to:
   determine that a timeout has lapsed; and
   direct the touch-sensing display interface to remove the overlaid icon.

13. The portable electronic device of claim 11, wherein the processor is further operative to:
   direct the touch-sensing display interface to display at least one of selectable menu options and cover art.

14. The portable electronic device of claim 10, wherein the processor is further operative to:
provide at least one of tactile and audio feedback to the user in response to detecting the touch gesture.

15. The portable electronic device of claim 10, wherein the touch gesture comprises a circular touch gesture, and wherein the processor is further operative to:
identify attributes of the circular touch gesture; and
adjust the volume of played back media based on the identified attributes.

16. The portable electronic device of claim 10, wherein the processor is further operative to direct the touch-sensing display interface to display a visual confirmation for the identified media playback operation on the touch-sensing display interface.

17. The portable electronic device of claim 10, wherein the identified media playback operation is also associated with a button input detected by the button interface, the button input mimicking the touch gesture.

18. The portable electronic device of claim 17, wherein:
the touch gesture comprises a combination of tapping and holding the touch-sensing display interface;
the button input comprises a combination of button presses and button holds; and
the touch gesture tapping and holding mimic the button presses and button holds, respectively.

19. The portable electronic device of claim 10, wherein the processor is further operative to provide audio feedback to the user in response to detecting the touch gesture, wherein the audio feedback comprises at least one tone that matches a touch pattern of the detected touch gesture.

20. The portable electronic device of claim 10, wherein the processor is further operative to provide tactile feedback to the user in response to detecting the touch gesture, wherein the tactile feedback comprises at least one vibration that matches a touch pattern of the detected touch gesture.

21. A method for controlling media playback operations using a touch-sensing display interface, comprising:
detecting a touch gesture on the touch-sensing display interface, wherein the detected touch gesture is not associated with any content displayed on the touch-sensing display interface;
identifying a media playback operation associated with the detected touch gesture; and
performing the identified media playback operation.

22. The method of claim 21, wherein the touch gesture comprises a circular touch gesture, and wherein the performing the identified media playback operation comprises adjusting the volume of played back media.

23. The method of claim 21, further comprising displaying a visual confirmation of the media playback operation on the touch-sensing display interface in response to the performing.

24. The method of claim 21, wherein no content is displayed on the touch-sensing display interface during the detecting.

25. Non-transitory computer-readable media for controlling media playback operations, comprising computer readable code recorded thereon for:
detecting a touch gesture on a touch-sensing display interface using the touch-sensing display interface when no content is displayed on the touch-sensing display interface;
determining that the detected touch gesture is associated with a playback operation; and
performing the playback operation associated with the detected touch gesture in response to the determining.

26. The non-transitory computer-readable media of claim 25, wherein:
the detecting the touch gesture comprises detecting a double tap touch gesture on the touch-sensing display interface using the touch-sensing display interface; and
the performing the playback operation comprises skipping to a next media track.

27. The non-transitory computer-readable media of claim 25, wherein:
the detecting the touch gesture comprises detecting a triple tap touch gesture on the touch-sensing display interface using the touch-sensing display interface; and
the performing the playback operation comprises skipping to a previous media track.

28. The non-transitory computer-readable media of claim 25, comprising further computer readable code recorded thereon for displaying a visual confirmation of the playback operation on the touch-sensing display interface.

* * * * *